United States Patent [19]

Toratani et al.

[11] Patent Number: 5,693,695
[45] Date of Patent: Dec. 2, 1997

[54] NATURAL RUBBER CONTAINING VISCOSITY STABILIZER AND METHOD FOR MANUFACTURING THE SAME

[75] Inventors: Hirotoshi Toratani, Tokyo; Yasushi Hirata, Saitama, both of Japan

[73] Assignee: Bridgestone Corporation, Tokyo, Japan

[21] Appl. No.: 518,838

[22] Filed: Aug. 24, 1995

[30] Foreign Application Priority Data

Aug. 31, 1994 [JP] Japan .................. HEI 6-206189

[51] Int. Cl.$^6$ .................................. C08K 5/20
[52] U.S. Cl. ........................................ 524/217
[58] Field of Search ......................... 524/217, 218

[56] References Cited

U.S. PATENT DOCUMENTS 3,718,628   2/1973   Boyer et al. .................. 260/79.5 B

FOREIGN PATENT DOCUMENTS 1 472 064   4/1977   United Kingdom .

*Primary Examiner*—Peter D. Mulcahy
*Attorney, Agent, or Firm*—Sughrue,Mion,Zinn,Macpeak & Seas, PLLC

[57] ABSTRACT

Natural rubber contains a viscosity stabilizer for the natural rubber, and the viscosity stabilizer includes a hydrazide compound of the following general formula, $$R\text{—}CONHNH_2$$

wherein R is an alkyl group having 1 to 5 carbon atoms or a cycloalkyl group having 3 to 5 carbon atoms. As a result, gelation (storage hardening) is suppressed and a decrease in molecular weight is prevented.

9 Claims, No Drawings

NATURAL RUBBER CONTAINING VISCOSITY STABILIZER AND METHOD FOR MANUFACTURING THE SAME

BACKGROUND OF THE INVENTION

1. Field of the Invention

The present invention relates to natural rubber containing a viscosity stabilizer and a method for manufacturing the same which impart a good processability and excellent physical properties, an additive for natural rubber having the effect of stabilizing viscosity, a rubber composition containing the additive, and a method for suppressing an increase in the viscosity of natural rubber with the additive.

2. Description of the Prior Art

In general, natural rubber is produced in tropical countries such as the Kingdom of Thailand, Malaysia, and the Republic of Indonesia. Natural rubber is used widely and massively in the rubber industry, the tire industry and the like due to its excellent physical properties.

Immediately after natural rubber is produced, mooney viscosity of the natural rubber is as low as 60 to 70. However, during the several months while natural rubber is transported to Japan and the like, mooney viscosity thereof increases up to nearly 90 to 100, that is, gelation takes place (so-called "storage hardening").

As a cause of storage hardening, it is well said that crosslinking is formed by the reaction of different kind bonds (an aldehyde group and the like) in an isoprene chain with protein and amino acids in natural rubber and then gelation takes place (the mechanism has not been determined definitely yet even in literatures).

The gelation in natural rubber (an increase in the amount of gel) deteriorates processability. In general, natural rubber having a high molecular weight is preferable from the consideration of physical properties, and a decrease in molecular weight deteriorates the physical properties of natural rubber.

The molecular weight of and the amount of gel in natural rubber are greatly influenced by conditions of rubber coagulation from natural rubber latex, of storage of natural rubber and of drying after water-washing.

As conventional drying conditions in processes for producing natural rubber, there are two typical methods as follows. One is the ribbed smoked sheet (RSS) graded by Type Description and Packing Specifications for Natural Rubber Grade Used in International Trade (so-called "Green Book"), and the other is technically specified rubber (TSR). According to RSS, smoking is carried out at around 60° C. for 5 to 7 days, and in accordance with TSR, hot air-drying is carried out at around 120° C. for several hours.

However, there is a problem that the drying conditions at the time of manufacturing RSS promote gelation of natural rubber. Also, there is a problem that the drying conditions at the time of manufacturing TSR lower the molecular weight of natural rubber. In addition, since in both RSS and TSR the viscosity thereof increases by gelation during storage (storage hardening), there is a problem that mastication causing a decrease in molecular weight is needed.

Here, British Patent Publication No. 1472064 discloses that it is effective to add a viscosity stabilizer to natural rubber and the viscosity stabilizer is a hydrazide compound having 8 to 30 carbon atoms. According to the publication, however, the viscosity stabilizer is added to natural rubber in rubber latex state immediately after the natural rubber is produced rather than natural rubber coagulated after the natural rubber has been dried. Taking a usual manufacturing process into consideration, the above-mentioned process is not practical. The British patent does not refer to how physical properties of the natural rubber containing the viscosity stabilizer change after vulcanization. In addition, when the hydrazide compound having a large number of carbon atoms as described in the British patent is added to natural rubber, there can be seen the deterioration of physical properties after vulcanization, for example, an increase in hysteresis loss.

Accordingly, it is antinomy to obtain natural rubber having a high molecular weight and less gel content using conventional techniques, and it is not possible to meet both demands.

In order to prevent the above-mentioned storage hardening, Rubber Research Institute of Malaysia (RRIM) has developed a technique that natural rubber latex is treated with about 0.08 wt % to 0.30 wt % of hydroxylamine sulfate ($NH_2OH \cdot H_2SO_4$) to prepare the natural rubber having a constant viscosity. There has been also developed the type that a solution of the same hydroxylamine sulfate is incorporated in natural rubber dried (SMR-GP).

However, natural rubber having a constant viscosity in the presence of hydroxylamine sulfate has the following disadvantages.

(1) It is hard to use hydroxylamine sulfate in Japan, since it is specified as a deleterious substance.

(2) An increase in viscosity is found in the early stage of storage.

(3) The effect of stabilizing viscosity deteriorates in severe circumstances (e.g. around 60° C. in an oven).

(4) Hydroxylamine sulfate is not compatible with rubber and is not well dispersed in rubber.

(5) The decomposition temperature of hydroxylamine sulfate is low, and its effect of stabilizing viscosity does not become sufficient on mixing at a high temperature.

In the literature (B. C. Sekhar, J. Polymer Science, vol.XLVIII, 133(1960)) which shows the results of screening of additives for natural rubber having an effect of stabilizing viscosity, semicarbazide ($NH_2NHCONH_2$) is referred to. As additives having a likely effect of stabilizing viscosity, hydroxylamine sulfate, semicarbazide and dimedone(1,1-dimethylcyclohexane-3,5-dione) are shown in the literature.

However, when an amount of each additive is less than some lower limit, it is confirmed with some fluctuation that from the beginning an effect of stabilizing viscosity is low or viscosity increases from a certain time. The causes are considered as follows:

a) a certain amount of the additives is needed to block aldehyde groups and the like which are considered to cause gelation.

b) the additives do not disperse sufficiently due to the small amount thereof

SUMMARY OF THE INVENTION

The present invention is to solve the problems concerning drying conditions in the above-mentioned conventional method for manufacturing natural rubber, that is, to solve the problem concerning the drying conditions at the time of manufacturing RSS or TSR.

Accordingly, an object of the present invention is to provide natural rubber having both a good processability and excellent physical properties and a production thereof while attempting the suppression of gelation and the prevention of a decrease in molecular weight.

The present invention is also to solve a problem concerning the above-mentioned conventional viscosity stabilizers.

Accordingly, another object of the present invention is to provide an additive for natural rubber, having a safe handling, a large and long-lasting effect of stabilizing viscosity, an additive-containing rubber composition and a method for suppressing an increase in the viscosity of natural rubber.

Aspects of the present invention are as follows:

(1) there is provided natural rubber containing a viscosity stabilizer for the natural rubber, the viscosity stabilizer comprising at least one hydrazide compound of the following general formula:

R—CONHNH$_2$ wherein R is an alkyl group having 1 to 5 carbon atoms or a cycloalkyl group having 3 to 5 carbon atoms;

(2) there is provided natural rubber containing a viscosity stabilizer for the natural rubber, the natural rubber having been treated with a strainer, the viscosity stabilizer comprising at least one hydrazide compound of the following general formula:

R—CONHNH$_2$ wherein R is an alkyl group having 1 to 5 carbon atoms or a cycloalkyl group having 3 to 5 carbon atoms;

(3) there is provided a method for manufacturing natural rubber, comprising the steps of:
drying the natural rubber; and
compounding a viscosity stabilizer for the natural rubber, the viscosity stabilizer comprising at least one hydrazide compound of the following general formula:

R—CONHNH$_2$ wherein R is an alkyl group having 1 to 5 carbon atoms or a cycloalkyl group having 3 to 5 carbon atoms;

(4) there is provided a method for manufacturing natural rubber, comprising the steps of:
compounding a viscosity stabilizer for the natural rubber into the natural rubber; and
treating the natural rubber with a strainer;

(5) there is provided an additive for natural rubber, comprising at least one hydrazide compound of the following general formula:

R—CONHNH$_2$ wherein R is an alkyl group having 1 to 5 carbon atoms or a cycloalkyl group having 3 to 5 carbon atoms;

(6) there is provided a rubber composition, comprising natural rubber and a viscosity stabilizer comprising at least one hydrazide compound of the following general formula:

R—CONHNH$_2$ wherein R is an alkyl group having 1 to 5 carbon atoms or a cycloalkyl group having 3 to 5 carbon atoms; and (7) there is provided a method for suppressing an increase in the viscosity of natural rubber, comprising the step of adding to the natural rubber a viscosity stabilizer comprising at least one hydrazide compound of the following general formula:

R—CONHNH$_2$ wherein R is an alkyl group having 1 to 5 carbon atoms or a cycloalkyl group having 3 to 5 carbon atoms.

DETAILED DESCRIPTION OF THE INVENTION

According to the present invention, for instance, in a process of manufacturing natural rubber which comprises the steps of treating the natural rubber in the order of tapping - coagulation - washing(water washing) - drying - packing, there is provided a method for manufacturing natural rubber which comprises the step of drying the natural rubber under conditions to result in a 10% or less difference of gel content and 85% or more molecular weight retention, preferably 5% or less difference of gel content and 90% or more molecular weight retention between before and after drying.

Also, natural rubber according to the present invention has been dried under conditions to result in a 10% or less difference of gel content and 85% or more molecular weight retention, preferably 5% or less difference of gel content and 90% or more molecular weight retention between before and after drying.

Although drying conditions which keep the difference of gel content 10% or less and the molecular weight retention 85% or more at the same time vary depending upon the kind and the grade of natural rubber used (produced), it is preferable that drying temperature is set at 90° to 120° C., more preferably 90° to 110° C., and drying time should be as short as possible, for example, preferably 2 to 3 hours in order to prevent both an increase in gelation and a decrease in molecular weight.

To be more presice, since the scission of a molecular chain takes place increasingly above 120° C., it is preferable that drying temperature is set at 90° to 120° C. when drying time is set at 2 to 3 hours. On the contrary, when the drying temperature is set at lower than 90° C., it is essential to dry natural rubber for a long term, while causes an increase in the amount of gel formation compared with a high drying temperature. Therefore, it is expected that the drying conditions of the present invention suppress gelation and prevent a decrease in molecular weight of natural rubber.

According to the present invention, natural rubber containing viscosity stabilizers can be prepared by treating the natural rubber under the above-mentioned drying conditions and mixing the viscosity stabilizers thereinto.

Natural rubber containing viscosity stabilizers according to the present invention may be prepared by mixing viscosity stabilizers into the natural rubber treated under the above-mentioned conditions as soon as possible. It is necessary to add viscosity stabilizers to natural rubber treated under the above-mentioned conditions as quickly as possible since gelation (storage hardening) proceeds even when the natural rubber dried is left at room temperature.

Natural rubber having a high molecular weight and no foreign material may be obtained, for example, by mixing viscosity stabilizers and the natural rubber with a mixer, an extruder or the like after drying the natural rubber conventionally or under the above-mentioned conditions and then by treating the natural rubber with a strainer in the above-mentioned method for manufacturing natural rubber.

An object of a strainer treatment is to remove foreign materials in natural rubber containing viscosity stabilizers. As an example of the strainer treatment, foreign materials can be removed by letting natural rubber containing viscosity stabilizers through a mesh-like material formed at the end of an extruder. The size of the mesh corresponding to 0.355 mm (No.45) defined by ASTM E11 is preferable. However, the size of the mesh may be chosen for each case depending on natural rubber produced and the size of foreign materials contained in the natural rubber and the like.

In order to disperse the viscosity stabilizers sufficiently, mixing is necessary. Besides, in order to let rubber through a strainer, heating (around 120° C.) is necessary. Therefore, it is efficient to carry out simultaneously the mixing of the viscosity stabilizers into natural rubber and the strainer treatment. Also, in order to suppress gelation caused by heating rubber, it is necessary to add viscosity stabilizers before the strainer treatment. Consequently, it is desired that the strainer treatment is carried out immediately after mixing viscosity stabilizers with natural rubber.

As viscosity stabilizers used in the method for manufacturing natural rubber under the above-mentioned drying conditions, there may be used, for example, hydroxylamine sulfate, semicarbazide, dimedone(1,1-dimethylcyclohexane-3,5-dione) and hydrazide compounds (additives for natural rubber used in the present invention) of the following general formula (I),

R—CONHNH$_2$  (I)

where R is an alkyl group having 1 to 5 carbon atoms or a cycloalkyl group having 3 to 5 carbon atoms.

The hydrazide compound of the general formula (I) may be used independently or in combination, and also the hydrazide compound of the general formula (I) may be used together with hydroxylamine sulfate, semicarbazide, dimedone or the like.

When these viscosity stabilizers are added to natural rubber dried under the above-mentioned conditions or a conventionally dried natural rubber, these viscosity stabilizers react with bonds of a different kind in an isoprene chain (such as an aldehyde group), resulting in blocking said bonds. Consequently, this reaction results in the prevention of the gelation reaction in natural rubber which causes the storage hardening and the suppression of an increase in an amount of gel.

Exemplary suitable aliphatic hydrazide compounds having an alkyl group of 1 to 5 carbon atoms of the above-mentioned general formula (I) include: acetic hydrazide, propionic hydrazide, butyric hydrazide, caproic hydrazide.

Exemplary suitable cylic hydrazide compounds having a cycloalkyl group of 3 to 5 carbon atoms of the above-mentioned general formula (I) include: cyclopropyl hydrazide.

As a hydrazide compound of the above-mentioned formula (I), an aliphatic hydrazide compound is preferable.

Furthermore, it has been found that the smell concentration of natural rubber decreases to around 1/10 when the aliphatic hydrazide of the present invention is added to the natural rubber. The aliphatic hydrazide compound has been found effective as an antismell agent.

Although the above-mentioned hydroxylamine sulfate, semicarbazide and dimedone have been known as a viscosity stabilizer, it has not been known at all to add these viscosity stabilizers to natural rubber dried under the above-mentioned conditions. For the first time, the present inventors have succeeded in developing the above-mentioned techniques. It can be attained for the first time to prevent a decrease in molecular weight and to suppress the increase in the amount of gel by employing both viscosity stabilizers and the above-mentioned drying conditions.

Hydrazide compounds of the above-mentioned general formula (I) are safe to handle. These compounds impart the effect of stabilizing viscosity when these compounds are added to natural rubber treated under the above-mentioned drying conditions or a conventionally dried natural rubber, and the effect of stabilizing viscosity lasts for a long time. Also, the hydrazide compounds do not deteriorate physical properties of the natural rubber after vulcanization.

As an embodiment to use hydrazide compounds of the above-mentioned general formula (I) as an additive for natural rubber, for example, some cases are considered that these compounds are added to produced natural rubber to prevent storage hardening, or these compounds are added thereto in the stage of mastication and the like.

A rubber composition according to the present invention comprises natural rubber containing hydrazide compounds of the above-mentioned general formula (I).

When the viscosity stabilizers are used for natural rubber treated under the above-mentioned drying conditions, it is preferable that a compound selected from hydroxylamine sulfate, semicarbazide, dimedone or a hydrazide compound of the above-mentioned general formula (I) is present in a total amount of 0.001 part by weight or more based on 100 parts by weight of the natural rubber.

It is also preferable that a viscosity stabilizer which comprises hydrazide compounds of the above-mentioned general formula (1) used for a rubber composition of the present invention is present in an amount of 0.001 part by weight or more based on 100 parts by weight of natural rubber.

When a viscosity stabilizer used for natural rubber treated under the above-mentioned drying conditions or a rubber composition is present in an amount of less than 0.001 part by weight based on 100 parts by weight of the natural rubber, the viscosity of natural rubber is not stabilized sufficiently. Although an amount of viscosity stabilizers depends on a variety of natural rubbers used (produced) and a variety of viscosity stabilizers used, the amount thereof more preferably ranges from 0.01 to 3.0 parts by weight based on 100 parts by weight of natural rubber.

For instance, regarding hydroxylamine sulfate, semicarbazide and dimedone used under the above-mentioned drying conditions, an amount thereof preferably ranges from 0.01 to 2.0 parts by weight based on 100 parts by weight of natural rubber.

As far as the above-mentioned general formula (I) is concerned, when the carbon number of R ranges from 1 to 5, the content of each hydrazide compound preferably ranges 0.01 to 1.0 part by weight, more preferably 0.03 to 0.5 part by weight based on 100 parts by weight of natural rubber. In the case of acetic hydrazide having 1 of carbon number in R, the lower limit is desired to be 0.04 part by weight.

The above-mentioned viscosity stabilizers may be contained individually or jointly in natural rubber and a rubber composition in the range of the above-mentioned content.

In addition to the above-mentioned viscosity stabilizers, if necessary, there may be added an optional component, such as softener, filler, reinforcer, vulcanizer, vulcanization accelerator, vulcanization accelerator auxiliary, antioxidant and the like into natural rubber treated under the above-mentioned drying conditions or a rubber composition of the present invention.

The present invention provides a method for suppressing an increase in the viscosity of natural rubber which comprises the step of adding to the natural rubber hydrazide compounds of the above-mentioned general formula (I). An amount of the hydrazide compounds added to the natural rubber is preferably 0.001 part by weight or more based on 100 parts by weight of natural rubber.

When the hydrazide compounds added to the natural rubber is present in an amount of less than 0.001 part by weight, an increase in the viscosity of natural rubber may not be suppressed sufficiently. The amount of the hydrazide compounds added depends on a kind of natural rubber used (produced) and a kind of hydrazide compounds. Preferably, the amount thereof to be added ranges from 0.01 to 3.0 parts by weight based on 100 parts by weight of natural rubber.

The range of the amount of a hydrazide compound used for a method for suppressing an increase in the viscosity of natural rubber is the same as that of the content of hydrazide compounds used for natural rubber as a viscosity stabilizer.

The effects of the present invention are as follows.

(1) Natural rubber having been dried under conditions of the present invention and a manufacturing method thereof result in a good processability and excellent physical properties of the natural rubber since a decrease in molecular weight and an increase in an amount of gel do not occur even after drying.

When hydrazide compounds shown in the present invention are added to natural rubber as a viscosity stabilizer, the natural rubber and a manufacturing method thereof lead to a good processability and excellent physical properties even after long term storage.

Natural rubber obtained by the present invention can be suitably used for a raw material needing a high precision such as dimensional stability and the like, for instance, tires for a plane, a bead inflation rubber.

(2) Additives for natural rubber according to the present invention obstruct the reaction of gelation in the natural rubber and suppress an increase in the viscosity of the natural rubber for a long time, since the compatibility of the additive to the natural rubber is good due to the small number of carbon atoms of the additives and the additives react with a different kind of functional group in an isoprene chain (such as an aldehyde group) to block them. Accordingly, when the additives are added to natural rubber produced, it is possible to prevent storage hardening, and as soon as the additives are added to the natural rubber in the stage of mastication, the effect of stabilizing viscosity appears.

(3) Since there is suppressed an increase in the viscosity of a rubber composition according to the present invention for a long time, the viscosity remains so low that a mastication process is not needed. Consequently, the shortage of Banbury mixers can be solved, and it is expected that it is possible to improve the productivity remarkably, and it is possible to reduce the cost remarkably.

(4) By a method for suppressing an increase in the viscosity of natural rubber according to the present invention, the increase in the viscosity of the natural rubber can be suppressed for a long time.

The present invention is now more particularly described by means of the following examples and comparative examples, but the present invention is not limited by these examples.

Examples 1 to 3, Comparative Examples 1 to 3

Natural rubber was prepared by using an unsmoked sheet as raw rubber based on the drying conditions shown in the following Table 1.

After leaving natural rubber at 60° C. for predetermined days, an amount of gel, molecular weight, carbon black dispersibility and tensile strength of the rubber vulcanized were measured.

The results are shown in the following Table 1.

An amount of gel, molecular weight, carbon black dispersibility and tensile strength of rubber vulcanized were measured by the following methods.

(1) Amount of Gel 0.2 g of rubber is dissolved in toluene (first grade) (60 cc), and gel is separated by centrifuging. After drying gel, an amount of the gel was weighed.

(2) Molecular Weight

Molecular weight was measured by a gel permeation chromatography method. Gel Permeation Chromatograph HCL-8020 manufactured by Toso K.K. was used for measurement. As a column, GMHXL manufactured by Toso K.K. was used. For calibration, a standard polystyrene manufactured by Toso K.K. was used. THF (first grade) was used as a solvent, and 0.01 g sample/30 cc THF was used as a solution.

(3) Carbon Black Dispersibility

Dispersibility was measured using a microscope based on ASTM D2663B. The larger the value, the better the dispersibility.

(4) Tensile Properties of Rubber Vulcanized

With regard to the preparation of rubber vulcanized, adding was carried out based on ASTM D3184 and Standard Formula 2A was used.

Tensile testing was carried out based on ASTM D1278.

Table 1 shows the following findings.

Examples 1 to 3 give natural rubber dried under the same conditions as shown in Table 1 and containing a viscosity stabilizer. Due to the addition of the viscosity stabilizer, good physical properties were obtained even after leaving the natural rubber for 29 days.

Comparative Example 1 gives natural rubber dried under the same conditions as in Examples 1 to 2 and containing no viscosity stabilizer. Thus, Comparative Example 1 is beyond the scope of the present invention. Although, good physical properties were obtained after leaving the natural rubber for 1 day, these physical properties largely deteriorated after leaving the natural rubber for 29 days.

Comparative Examples 2 to 3 are beyond the scope of the present invention and Comparative Example 2 is based on drying conditions of a conventional RSS, and Comparative Example 3 is based on drying conditions of a conventional TSR.

In Comparative Example 2, an amount of gel after drying increased largely and furthermore, carbon black dispersibility and tensile properties of the rubber vulcanized became poor.

In Comparative Example 3, an increase in an amount of gel after drying was suppressed, but molecular weight decreased largely. Also, carbon black dispersibility and tensile properties of rubber vulcanized became poor.

Examples 4 to 6, Comparative Examples 4 to 7

In the following Table 2 there are shown additives for natural rubber, the change of mooney viscosity with time and Resilience thereof.

The preparation of a rubber composition (masticated rubber) containing additives for natural rubber used in Examples 4 to 6, Comparative Examples 4 to 7 and a measurement method of mooney viscosity are as follows.

Examples 4 to 6 and Comparative Examples 4 to 7 show a rubber composition which was prepared by adding a predetermined amount of a chemical to natural rubber dried under the same conditions as in Examples 1 to 2 and by masticating the resulting rubber composition at 120° C. for 2 minutes.

A Measurement Method of Mooney Viscosity

In order to confirm whether a constant viscosity is attained, after the masticated rubber of Examples 4 to 6 and Comparative examples 4 to 7 was left in an oven at 60° C. to make a hardening accelerating circumstance, the change of mooney viscosity with time was measured.

A Measurement Method of Resilience

The measurement of resilience was carried out based on DIN standard 53512 using Dunlop toripsometer (manufactured Toyo Seiki Co.).

As is clear from Table 2, compared to Comparative Examples 4 to 7, Examples 4 to 6 show substantially no change with time in mooney viscosity, and an effect of stabilizing viscosity lasted for a long time. Also, the rubber compositions of Examples 4 to 6 show better resilience then those of Comparative Examples 4 to 7.

TABLE 1

|  | Example | | | Comparative Example | | |
|---|---|---|---|---|---|---|
|  | 1 | 2 | 3 | 1 | 2 | 3 |
| Drying condition | | | | | | |
| Drying time | 2 hours | 2 hours | 2 hours | 2 hours | 5 days | 2 hours |
| Drying temperature | 100° C. | 100° C. | 110° C. | 100° | 60° C. | 120° C. |
| Viscosity stabilizer | acetic hydrazide | propionic hydrazide | propionic hydrazide | — | — | — |
| Content of viscosity stabilizer (mol/NR 100 g) | $6.0 \times 10^{-4}$ | $6.0 \times 10^{-4}$ | $2.4 \times 10^{-4}$ | — | — | — |
| After 1 day | | | | | | |
| Amount of gel | 7% | 7% | 8% | 10% | 14% | 10% |
| Molecular weight | $1.9 \times 10^5$ | $1.9 \times 10^5$ | $1.9 \times 10^5$ | $1.9 \times 10^5$ | $2.0 \times 10^6$ | $1.5 \times 10^6$ |
| Carbon black dispersibility | 92% | 93% | 90% | 88% | 80% | 87% |
| Tensile strength (kg/cm²) | 300 | 298 | 300 | 295 | 290 | 280 |
| After 29 days | | | | | | |
| Amount of gel | 9% | 9% | 10% | 28% | 27% | 31% |
| Molecular weight | $1.9 \times 10^5$ | $1.9 \times 10^5$ | $1.9 \times 10^5$ | $1.9 \times 10^5$ | $2.0 \times 10^6$ | $1.5 \times 10^5$ |
| Carbon black dispersibility | 91% | 90% | 88% | 65% | 68% | 64% |
| Tensile strength (kg/cm²) | 302 | 300 | 301 | 281 | 284 | 276 |

TABLE 2

| | Example | | |
|---|---|---|---|
| Added chemicals | 4 acetic hydrazide | 5 propionic hydrazide | 6 caproic hydrazide |
| Mooney viscosity immediately after mastication | 58.9 | 60.2 | 59.0 |
| After 3–4 days (60° C.) | 56.3 | 59.0 | 58.3 |
| After 6–7 days (60° C.) | 57.2 | 59.4 | 58.5 |
| After 10 days (60°) | 58.0 | 59.6 | 58.7 |
| Resilience | 50.4 | 50.2 | 49.1 |

| | Comparative Example | | | |
|---|---|---|---|---|
| | 4 2-ethylhexanoic hydrazide | 5 naphthenic hydrazide | 6 benzoic hydrazide | 7 — |
| | 60.5 | 59.5 | 61.0 | 65.0 |
| | 61.9 | 61.0 | 64.5 | 70.2 |
| | 62.8 | 62.1 | 65.1 | 81.3 |
| | 64.9 | 63.5 | 66.2 | 83.9 |
| | 47.2 | 46.8 | 47.9 | 47.0 |

What is claimed is:

1. Natural rubber containing a viscosity stabilizer for the natural rubber, the viscosity stabilizer comprising at least one hydrazide compound of the following general formula:

$$R-CONHNH_2$$

wherein R is an alkyl group having 1 to 5 carbon atoms or a cycloalkyl group having 3 to 5 carbon atoms and the hydrazide compound is present in an amount of 0.001 part by weight or more based on 100 parts by weight of the natural rubber.

2. The natural rubber according to claim 1, wherein the natural rubber has been dried under conditions to result in a 10% or less difference of gel content and 85% or more molecular weight retention between before and after drying.

3. The natural rubber according to claim 2, wherein the natural rubber has been dried at a temperature ranging from 90° to 120° C. before adding the hydrazide compound.

4. Natural rubber containing a viscosity stabilizer for the natural rubber, the natural rubber having been treated with a strainer, the viscosity stabilizer comprising at least one hydrazide compound of the following general formula:

$$R-CONHNH_2$$

wherein R is an alkyl group having 1 to 5 carbon atoms or a cycloalkyl group having 3 to 5 carbon atoms and the hydrazide compound is present in an amount of 0.001 part by weight or more based on 100 parts by weight of the natural rubber.

5. A method for manufacturing natural rubber, comprising the steps of:

drying the natural rubber; and compounding a viscosity stabilizer for the natural rubber, the viscosity stabilizer comprising at least one hydrazide compound of the following general formula:

$$R-CONHNH_2$$

wherein R is an alkyl group having 1 to 5 carbon atoms or a cycloalkyl group having 3 to 5 carbon atoms and the hydrazide compound is present in an amount of 0.001 part by weight or more based on 100 parts by weight of the natural rubber.

6. The method for manufacturing natural rubber according to claim 5, wherein the drying is conducted under conditions to result in a 10% or less difference of gel content and 85% or more molecular weight retention between before and after drying.

7. A method for manufacturing natural rubber, comprising the steps of:

compounding a viscosity stabilizer for the natural rubber into the natural rubber; and treating the natural rubber with a strainer, wherein the viscosity stabilizer for the natural rubber comprises at least one hydrazide compound of the following general formula:

R—CONHNH$_2$ wherein R is an alkyl group having 1 to 5 carbon atoms or a cycloalkyl group having 3 to 5 carbon atoms, and the hydrazide compound is present in an amount of 0.001 part by weight or more based on 100 parts by weight of the natural rubber.

8. A rubber composition, comprising natural rubber and a viscosity stabilizer comprising at least one hydrazide compound of the following general formula:

R—CONHNH$_2$ wherein R is an alkyl group having 1 to 5 carbon atoms or a cycloalkyl group having 3 to 5 carbon atoms and the hydrazide compound is present in an amount of 0.001 part by weight or more base on 100 parts by weight of the natural rubber.

9. A method for suppressing an increase in the viscosity of natural rubber, comprising the step of adding to the natural rubber a viscosity stabilizer comprising at least one hydrazide compound of the following general formula:

R—CONHNH$_2$ wherein R is an alkyl group having 1 to 5 carbon atoms or a cycloalkyl group having 3 to 5 carbon atoms and the hydrazide compound is present in an amount of 0.001 part by weight or more based on 100 parts by weight of the natural rubber.

* * * * *